United States Patent Office 3,141,215
Patented July 21, 1964

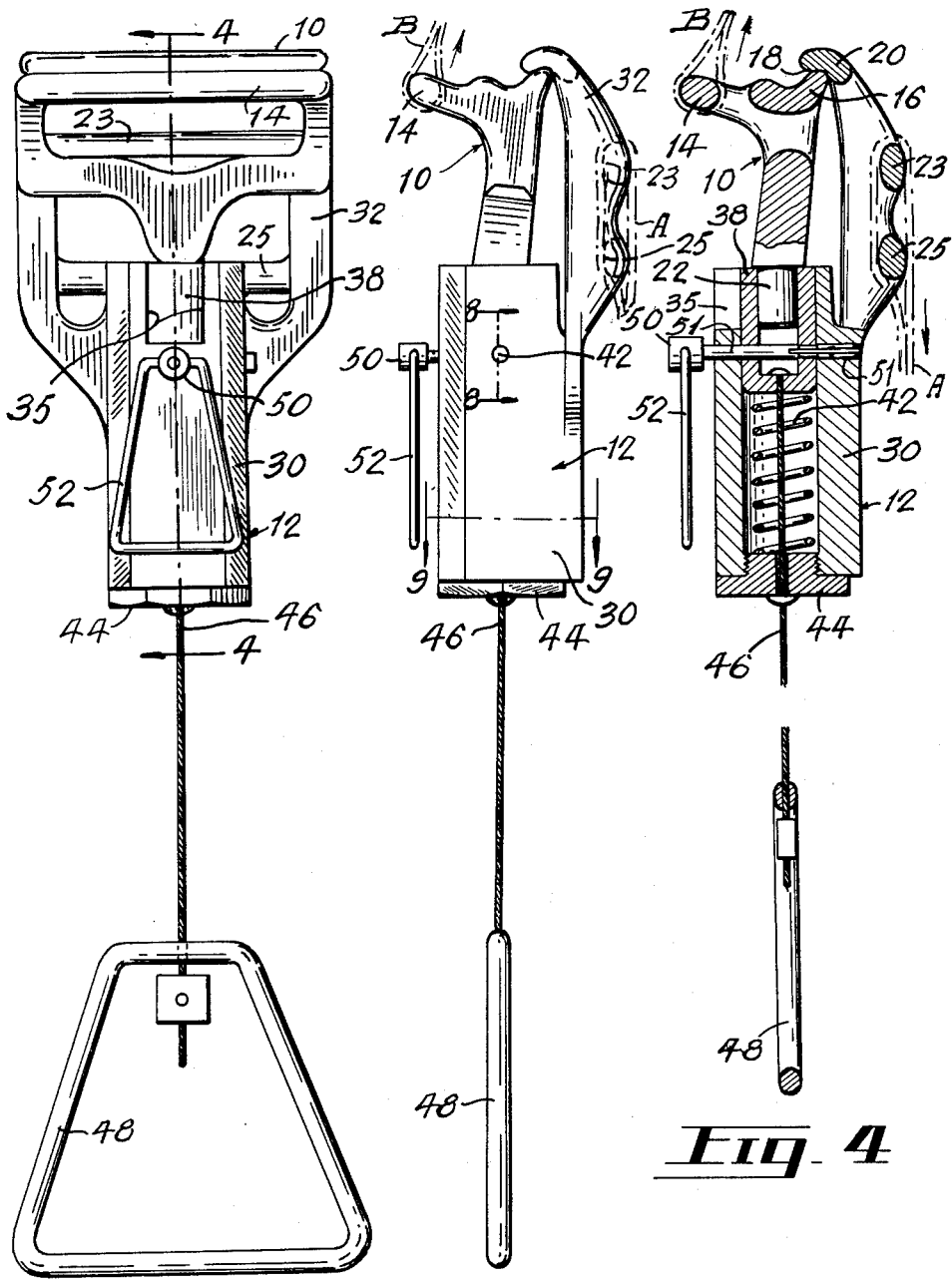

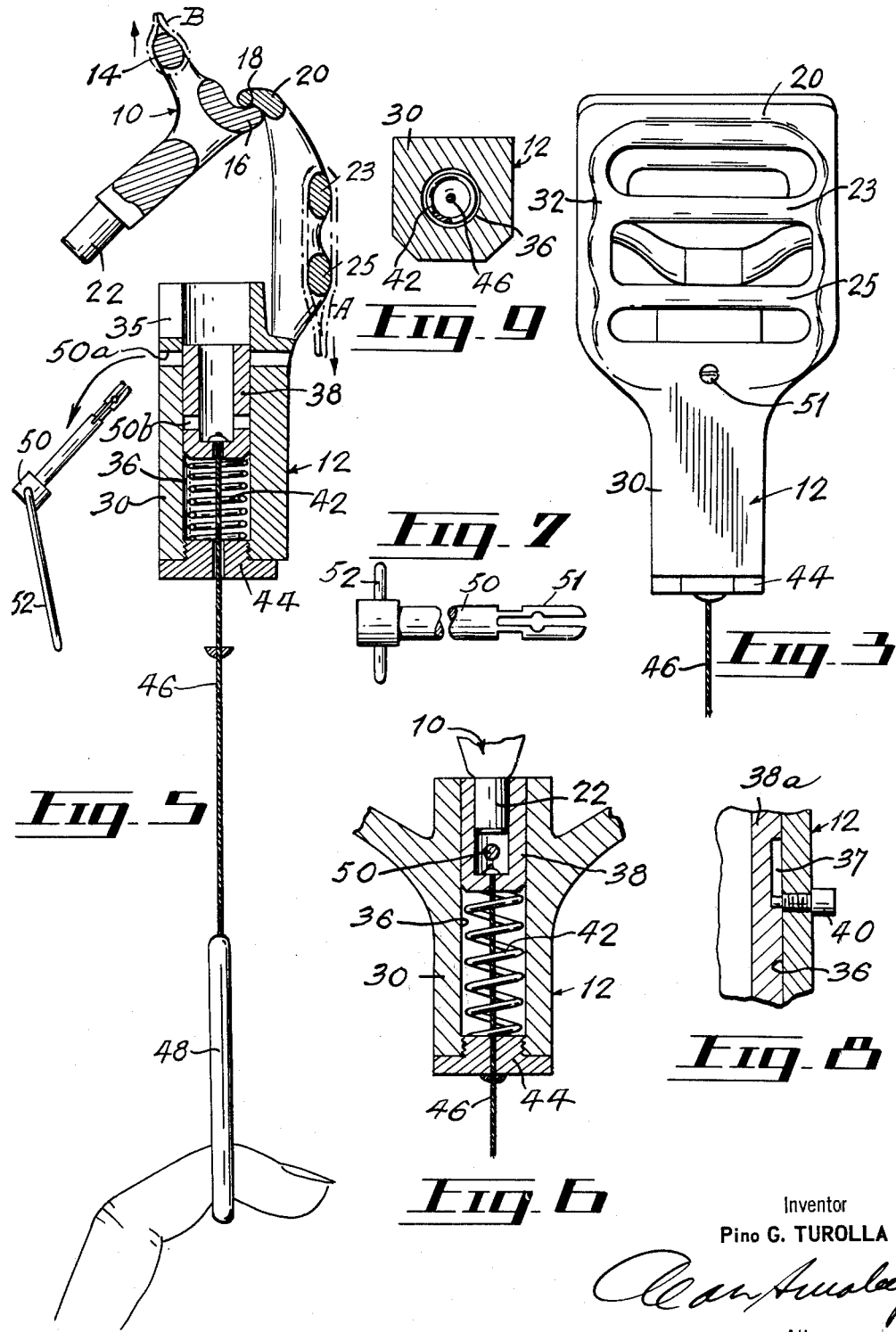

3,141,215
QUICK RELEASE FASTENER
Pino G. Turolla, 2054 Prairie Ave., Miami Beach, Fla.
Filed June 1, 1962, Ser. No. 199,452
1 Claim. (Cl. 24—201)

The present invention relates to improvements in the construction of parachutes and more particularly to an improved quick riser release whereby the chute may be deflated or completely released from the parachute harness.

An important factor in the safe landing of a person or of cargo from a parachute descent is the provision for immediate control of the deflation or, when necessary, the immediate release of the entire chute to avoid dragging of the person or cargo along the ground. As is well known, most injuries to parachutists occur when landings are attempted in high winds or over rough terrain and the parachutes are not "spilled" or released fast enough to prevent the user from being dragged along behind the open or partially open chute.

There are certain requirements which must be considered in the construction of a quick release arrangement for a parachute harness. First and most obvious, is the requirement that the release should embody safety features which will prevent accidental release or failure when the chute is in the air. Further, such a quick release must be located in a position where the controls are readily accessible, and the controls must be constructed so as to require minimum effort for their operation.

The present invention is the result of thorough consideration of all the above requirements and the resultant problems and aims to provide a quick release arrangement that is adapted for an immediate and positive release of one or both of the usual harness risers from the shoulders, or cargo, after landing. This quick release creates an immediate deflation of the parachute canopy, consequently preventing any dragging of the load along the ground irrespective of wind velocity. In accordance with the invention the quick riser release can be operated manually and/or is equally suited for automatic release.

More specifically, the quick riser release of the invention consists essentially of two main parts, namely, a male fitting T-ring release or "fly-away" that replaces the usual right and left riser slice eyes of a standard parachute construction, and a female fitting H-ring ejector which replaces the usual right or left harness shoulder adapter on a parachute harness. The T-ring fits within the H-ring ejector and is secured in position by engagement with a spring biased piston. The spring biased piston is retained against accidental release by a safety pin and means are provided whereby the safety pin and piston may be released in sequence.

Having thus generally described the nature of the invention, particular reference will be made to the accompanying drawings, and in which:

FIGURE 1 is a view in front elevation of a quick riser release arrangement in accordance with the invention as it would appear in secured and locked condition.

FIGURE 2 is a view in side elevation of the construction shown in FIGURE 1.

FIGURE 3 is a rear elevation of the construction shown in FIGURE 1.

FIGURE 4 is a cross-sectional view of FIGURE 1 along the line 4—4.

FIGURE 5 is a cross-sectional view corresponding to FIGURE 4 showing diagrammatically the release of the safety pin and H-ring piston with the T-ring shown as flying out under the pull of the parachute.

FIGURE 6 is an enlarged cross-sectional view showing the interior of the H-ring ejector to illustrate in more detail the arrangement of the piston, safety pin, and retained end of the T-ring.

FIGURE 7 is an enlarged detail view of the safety pin.

FIGURE 8 is an enlarged detail view along the line 8—8 of FIGURE 2 to illustrate the guide screw and groove limiting the stroke of the H-ring piston.

FIGURE 9 is a section of FIGURE 2 along the line 9—9 to illustrate the preferred section and location of the piston biasing spring.

With particular reference to the drawings the main components of the present device consist of a male fitting T-ring release 10 which replaces the usual right or left riser slice eye of a parachute harness and a female H-ring ejector 12 which replaces the usual right or left shoulder harness adapter. As is shown most clearly in FIGURE 2 for example, the H-ring 12 is secured directly to the harness strap "A" while the T-ring 10 is secured to the parachute riser "B." It will be understood that there will be a pair of riser release devices in accordance with the invention on each parachute harness replacing the usual left and right attachments but as these are identical the following description refers to one such device only.

The T-ring release 10 is shaped so that the upper portion has an outstanding loop 14 to which the riser is attached and an H-ring engaging piston 16 which is shaped as shown to hook against the inner surface 18 of the top loop 20 of the H-ring 12 and which serves as a pivot or fulcrum point about which the T-ring swings clear of the H-ring 12 when released. The main body of the T-ring 10 terminates in a cylindrical piston engaging end 22 which fits within the H-ring 12 as will be described.

As shown most clearly in FIGURES 2, 3 and 6 the H-ring ejector 12 is formed so as to have a main body portion 30 of substantially square cross section with an offset upper portion 32 providing the loops or bars 23, 25 to which the chute harness is attached and the T-ring engaging top loop 20 which is somewhat hook-shaped on its undersurface 18. The interior of the H-ring ejector main body 30 is bored axially to provide the piston receiving cylinder 36. An open ended piston 38 is slidably mounted in the cylinder 36 and is guided for limited travel therein by means of a slot 37 provided in the piston wall 38a, and a guide screw 40 extending through a side wall of the body 30 into the cylinder 36 into engagement with the piston slot 37. The piston 38 is normally urged upwards within the cylinder 36 by a coil spring 42 bearing against a closure member 44 threadably engaged with the lower end of the cylinder 36. A flexible cable 46 extends from the bottom of the piston 38, through the cylinder 36 and closure member 44 to a connection with a release handle 48 so a pull on the handle 48 moves the piston 38 downwardly against the spring 42. As a safety measure, a safety pin 50, shown in detail in FIGURE 7, fits through aligned openings 50a, 50b provided in the walls of the cylinder 36 and piston 38. As shown in detail the terminal end 51 of the pin 50 is split and is slightly oversize so that when in securing position it is wedged in position. The safety pin 50 is provided with a release handle 52 so that it can be quickly pulled out to permit release of the retaining piston 38.

As is shown most clearly in FIGURES 4 and 5 when parachute is prepared for load bearing condition the piston engaging end 22 of the T-ring 10 is engaged in the piston 38 by placing the H-ring engaging portion 22 into position as shown and swinging the end 22 through a clearance slot 35 in the H-ring body into alignment with the piston 38 which is depressed to its lower limit clearing the slot. When aligned the piston 38 is released locking the T-ring end 22 in place within the piston. The safety pin 50 is then inserted and the release is in operational condition as shown.

For immediate release against the pull of the parachute, the safety pin 50 is first pulled by the handle 52 and when desired the piston 38 is depressed by the handle 48 clearing the T-ring end 22. As shown in FIGURE 3, the clearing of the T-ring end 22 and under the pull of the parachute riser "A," causes the T-ring 10 to swing out away from the H-ring ejector 12 releasing one side of the parachute causing it to deflate. If the parachute is to be released completely both release mechanisms, left and right, would be operated accordingly.

I claim:

A releasable coupler for use between a parachute riser and harness strap comprising a male and female fitting detachably connected to each other and separable due to tension imposed therebetween; said female fitting comprising an elongated body portion having a bore opening into one end thereof, said female fitting including a loop portion extending vertically from said body portion and offset to one side of said bore for engagement with a harness strap, said loop terminating in an upper, generally concave fulcrum portion generally opening toward and overlying said bore portion, said female fitting including a laterally opening recess at the upper end of said body opening away from said female fitting loop portion and intersecting said bore portion, a reciprocally supported piston in said bore portion and including an upper abutment end portion positionable into alignment with said recess, a compression spring element seated in said bore portion and engaged with said piston and movably urging the abutment end portion of said piston toward intersecting engagement with said recess, said male fitting including an upper generally convex edge generally complementary to said fulcrum portion and an intermediate, laterally offset loop portion for engaging a riser strap, the lower end of said male fitting comprising a lower abutment portion pivotal through said recess about said fulcrum portion, the upper abutment end of said piston and the lower abutment portion of said male fitting including interengaged portions for restraining said male element from pivoting about said fulcrum portion, and a pull element on the lower end of said piston for permitting said piston to be drawn into said bore whereby said interengaged abutment portions are disengaged and tension between said male and female fittings permit said male fitting to pivot on said fulcrum portion.

References Cited in the file of this patent

UNITED STATES PATENTS

| 699,398 | Larsen | May 6, 1902 |
| 1,565,678 | Severson | Dec. 15, 1925 |
| 2,404,909 | Johnston | July 30, 1946 |
| 2,473,554 | Warner | June 21, 1949 |
| 2,522,790 | Johnston | Sept. 19, 1950 |
| 2,623,255 | Thomsen | Dec. 30, 1952 |

FOREIGN PATENTS

| 13,520 | Austria | Oct. 10, 1903 |
| 711,940 | France | Sept. 21, 1931 |
| 834,146 | France | Nov. 14, 1938 |
| 825,575 | Great Britain | Dec. 16, 1959 |
| 87,037 | Norway | Mar. 5, 1956 |